(12) United States Patent
Avasiloaie et al.

(10) Patent No.: US 9,434,354 B2
(45) Date of Patent: Sep. 6, 2016

(54) UNIVERSAL COUPLER FOR A BEAM BLADE WINDSHIELD WIPER ASSEMBLY

(71) Applicant: TRICO PRODUCTS CORPORATION, Rochester Hills, MI (US)

(72) Inventors: Valentin Avasiloaie, Dearborn Heights, MI (US); Dan Ehde, Ortonville, MI (US)

(73) Assignee: Trico Products Corporation, Rochester Hills, MI (US)

( * ) Notice: Subject to any disclaimer, the term of this patent is extended or adjusted under 35 U.S.C. 154(b) by 246 days.

(21) Appl. No.: 14/094,078

(22) Filed: Dec. 2, 2013

(65) Prior Publication Data

US 2014/0082876 A1  Mar. 27, 2014

Related U.S. Application Data

(62) Division of application No. 13/232,514, filed on Sep. 14, 2011, now Pat. No. 8,938,847.

(60) Provisional application No. 61/383,115, filed on Sep. 15, 2010.

(51) Int. Cl.
  *B60S 1/38* (2006.01)
  *B60S 1/40* (2006.01)

(52) U.S. Cl.
  CPC .............. *B60S 1/4003* (2013.01); *B60S 1/381* (2013.01); *B60S 1/387* (2013.01); *B60S 1/407* (2013.01); *B60S 1/4048* (2013.01); *B60S 1/3889* (2013.01);

(Continued)

(58) Field of Classification Search
  CPC ...... B60S 1/4003; B60S 1/387; B60S 1/407; B60S 1/4067; B60S 1/4074; B60S 1/4077
  USPC ....................................... 15/250.32
  See application file for complete search history.

(56) References Cited

U.S. PATENT DOCUMENTS

| 2,876,482 A | * | 3/1959 | Oishei .................. B60S 1/3801 |
| | | | 15/250.4 |
| 7,587,783 B1 | | 9/2009 | Lin |
| 7,669,276 B2 | | 3/2010 | Verelst et al. |

(Continued)

FOREIGN PATENT DOCUMENTS

| BE | WO 2010028866 A1 * | 3/2010 | .............. B60S 1/387 |
| DE | 102009014700 A1 | 10/2009 | |

(Continued)

OTHER PUBLICATIONS

FR2916715A1 (machine translation), 2008.*

(Continued)

*Primary Examiner* — Monica Carter
*Assistant Examiner* — Andrew A Horton
(74) *Attorney, Agent, or Firm* — Miller Canfield

(57) ABSTRACT

A beam blade windshield wiper assembly having a universal coupler assembly including a carrier, a saddle that is removably received and retained by the carrier, and a coupler that is operatively mounted to the saddle. The carrier, saddle, and coupler cooperate to accommodate various sizes of "pinch-type" attachment members, "push-button-type" attachment members, as well as "side-pin-type" and "pin-and-bent-tab-type" attachment members that are used to connect the wiper arm and the windshield wiper assembly.

5 Claims, 13 Drawing Sheets

(52) U.S. Cl.
CPC ....... *B60S 1/4074* (2013.01); *B60S 2001/4054* (2013.01)

(56) References Cited

U.S. PATENT DOCUMENTS

| | | | |
|---|---|---|---|
| 2004/0074037 A1* | 4/2004 | Op't Roodt | B60S 1/40 15/250.32 |
| 2006/0021179 A1* | 2/2006 | Yang | B60S 1/4003 15/250.32 |
| 2006/0218740 A1 | 10/2006 | Coughlin | |
| 2008/0163448 A1 | 7/2008 | Yang et al. | |
| 2009/0199357 A1 | 8/2009 | Thienard | |
| 2010/0050361 A1 | 3/2010 | Chang et al. | |
| 2011/0277265 A1 | 11/2011 | Ehde | |

FOREIGN PATENT DOCUMENTS

| | | | | |
|---|---|---|---|---|
| FR | 2916715 A1 | * | 12/2008 | .............. B60S 1/387 |
| KR | 10-0903374 | * | 6/2009 | .............. B60S 1/386 |
| WO | 2010028866 A1 | | 3/2010 | |

OTHER PUBLICATIONS 10-0903374 (machine translation), 2009.*
WO2010028866 (Machine Translation), 2010.
DE102009014700 (Machine Translation), 2009.
Apr. 9, 2012 International Search Report and Written Opinion for PCT/US2011/051540.

* cited by examiner

UNIVERSAL COUPLER FOR A BEAM BLADE WINDSHIELD WIPER ASSEMBLY

CROSS REFERENCE TO RELATED APPLICATIONS

This application is a divisional of Ser. No. 13/232,514, filed on Sep. 14, 2011, which claims the benefit of U.S. provisional patent application entitled "Universal Coupler for a Beam Blade Windshield Wiper Assembly," having Ser. No. 61/383,115, and filed on Sep. 15, 2010.

BACKGROUND OF THE INVENTION

1. Field of the Invention

The present invention relates, generally, to windshield wiper assemblies. More specifically, the present invention relates to a universal coupler for a beam blade windshield wiper assembly for use in connecting the beam blade wiper to various styles of wiper arms.

2. Description of the Related Art

Windshield wipers known in the related art include two categories commonly referred to as, "tournament" wipers and "beam blade" style wipers. In either category, the windshield wiper assembly is removably connected to the wiper arm of a vehicle. Specifically, a wiper coupler is employed to facilitate the connection between the windshield wiper assembly and the attachment member of the wiper arm.

At the manufacturing level, there is usually not much concern over compatibility between the wiper assemblies and the wiper arm since these components are typically supplied to OEM vehicle manufacturers as a part of an overall wiper system. However, windshield wiper assemblies wear out and must be replaced. Typically, the wiper coupler for a beam blade windshield wiper assembly is designed solely for use in connection with a single style of wiper arm attachment member. In the aftermarket, compatibility between the wiper arm and windshield wiper assembly is a problem. End users are provided with few, if any, options for replacement wiper assemblies and are often required to purchase replacement wiper assemblies from dealerships for the OEM vehicle manufacturer.

As a result of the limited aftermarket availability and limited options associated with beam blade windshield wipers, there is a need in the art for a universal coupler for a beam blade windshield wiper assembly that operatively couples the beam blade windshield wiper to several different wiper arm attachment members.

SUMMARY OF THE INVENTION

The present invention overcomes the limitations and disadvantages in the related art in a beam blade windshield wiper assembly having a universal coupler assembly. The windshield wiper assembly includes a wiping element that contacts the surface to be wiped, at least one elongated beam having a pair of longitudinal ends, and a coupler assembly. The coupler assembly includes a carrier that is mounted to the elongated beam between its longitudinal ends. A saddle is removably received and retained by the carrier. A coupler is adapted to be mounted to the saddle. The coupler includes a pair of sidewalls, and a deck disposed between the sidewalls. The deck serves to cooperate with the sidewalls to define a rest that is adapted to operatively receive the track of an attachment member, the coupler further includes a pair of flanges extending outwardly beyond each of the sidewalls to provide releasable engagement with an attachment member. The carrier, saddle, and coupler cooperate to accommodate various sizes of "pinch-type" attachment members, "push-button-type" attachment members, as well as "pin-type" and "pin-and-bent-tab-type" attachment members that are used to connect the wiper arm and the windshield wiper assembly.

Thus, one advantage of the present invention is that it provides a universal coupler for a beam blade windshield wiper assembly that is adapted to releasably engage several different wiper arm attachment members, thereby reducing the need for several different windshield wiper assemblies at the OEM level.

Still another advantage of the present invention is that it provides an interchangeable coupler assembly that can engage several different wiper arm attachment members, thereby reducing the need for multiple aftermarket beam blade windshield wiper replacement assemblies having the same superstructure but a different, single-application, coupler assembly to reduce the costs associated with point-of-sale packaging and replacing a beam blade wiper blade assembly.

Other objects, features and advantages of the present invention will be readily appreciated as the same becomes better understood after reading the subsequent description taken in connection with the accompanying drawings.

DETAILED DESCRIPTION OF THE PREFERRED EMBODIMENT(S)

Figure 1:
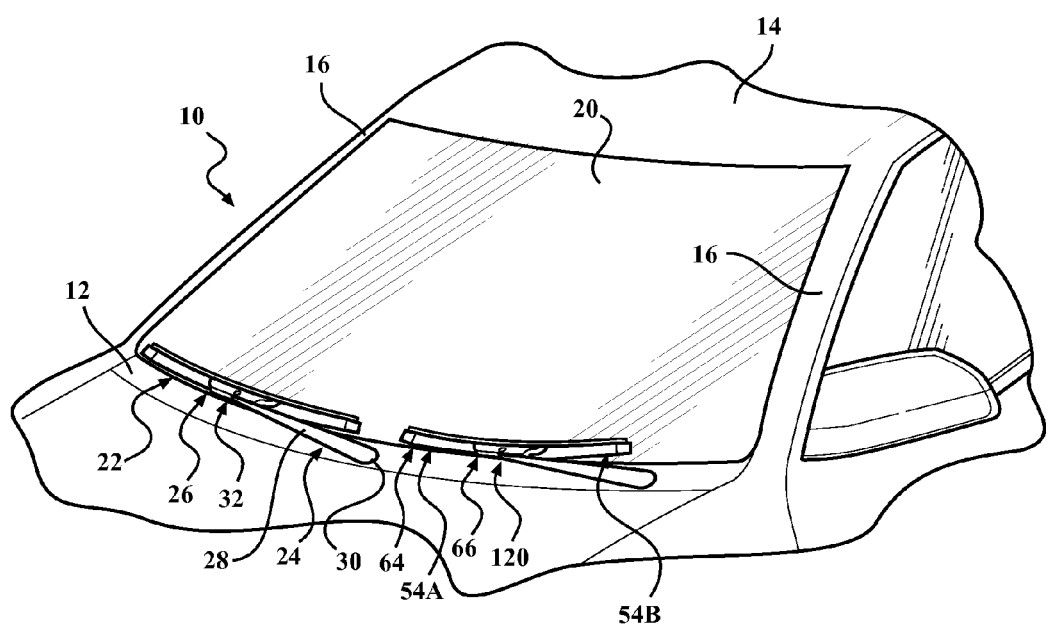
FIG. 1 is a partial perspective view of the front of an automotive vehicle having a pair of windshield wiper assemblies that are pivotally mounted for reciprocal movement across the windshield of the vehicle.

Referring now to the figures, where like numerals are used to designate like structure, a portion of a vehicle is schematically illustrated at 10 in FIG. 1. The vehicle includes a cowl 12, a roof 14, and a pair of laterally spaced front or "A" pillars 16 extending between the roof 14 and the cowl 12. The A-pillars 16, roof 14, and cowl 12 cooperate to support a curved or "swept back" glass windshield 20 located therebetween.

A wiper system is generally indicated at 22 in FIG. 1 and is employed to clean the glass windshield 20. The wiper system 22 includes a wiper arm, generally indicated at 24 and a beam blade windshield wiper assembly, generally indicated at 26, (hereinafter referred to as a "wiper assembly"). The wiper assembly 26 is releasably engaged to the wiper arm 24 and adapted to clean the surface to be wiped, namely a windshield 20. Those having ordinary skill in the art will appreciate that a wiper system 22 may include more than one wiper arm 24 and wiper assembly 26. By way of example and as indicated in FIG. 1, a wiper system 22 may include a pair of wiper arms 24 and wiper assemblies 26, which correspond to the driver and passenger side of the vehicle 10. Furthermore, those having ordinary skill in the art will appreciate, that wiper assemblies 26 may be employed in other areas of a vehicle 10, such as a rear window (not shown) or a head lamp (not shown) that employs a wiper system 20. Thus, it will be understood that the present invention is not limited for use solely in connection with wiper arms 24 adjacent to a vehicle's windshield 20, but for use in all applications where wiper assemblies 26 are employed.

The wiper arm 24 includes an elongate body 28 having a pivot end 30 that is operatively engaged to a motor (not shown) that drives the wiper arm 24 in an oscillating manner across the windshield 20. More specifically, the elongate body 28 is operatively attached to the pivot end 30 in a hinged manner to enable a person to elevate the elongate body 28 away from the windshield 20. Articulation between the pivot end 30 and elongate body 28 in this manner is conventionally known to enable maintenance or inspection of the wiper system 22 and/or windshield 18 as well as for removal and installation of wiper assemblies 26. Those having ordinary skill in the art will appreciate that the wiper arm 24 may further include a biasing member to impart a downward force through the wiper arm 24 and onto the wiper assembly 26 to facilitate contact between the wiper assembly 26 and the windshield 20 of the vehicle 10. By way of example, the biasing member may include a spring. It should further be appreciated that the elongate body 28 of the wiper arm 24 may include a cavity adjacent to the pivot end 30 to operatively receive the biasing member.

Figure 18:
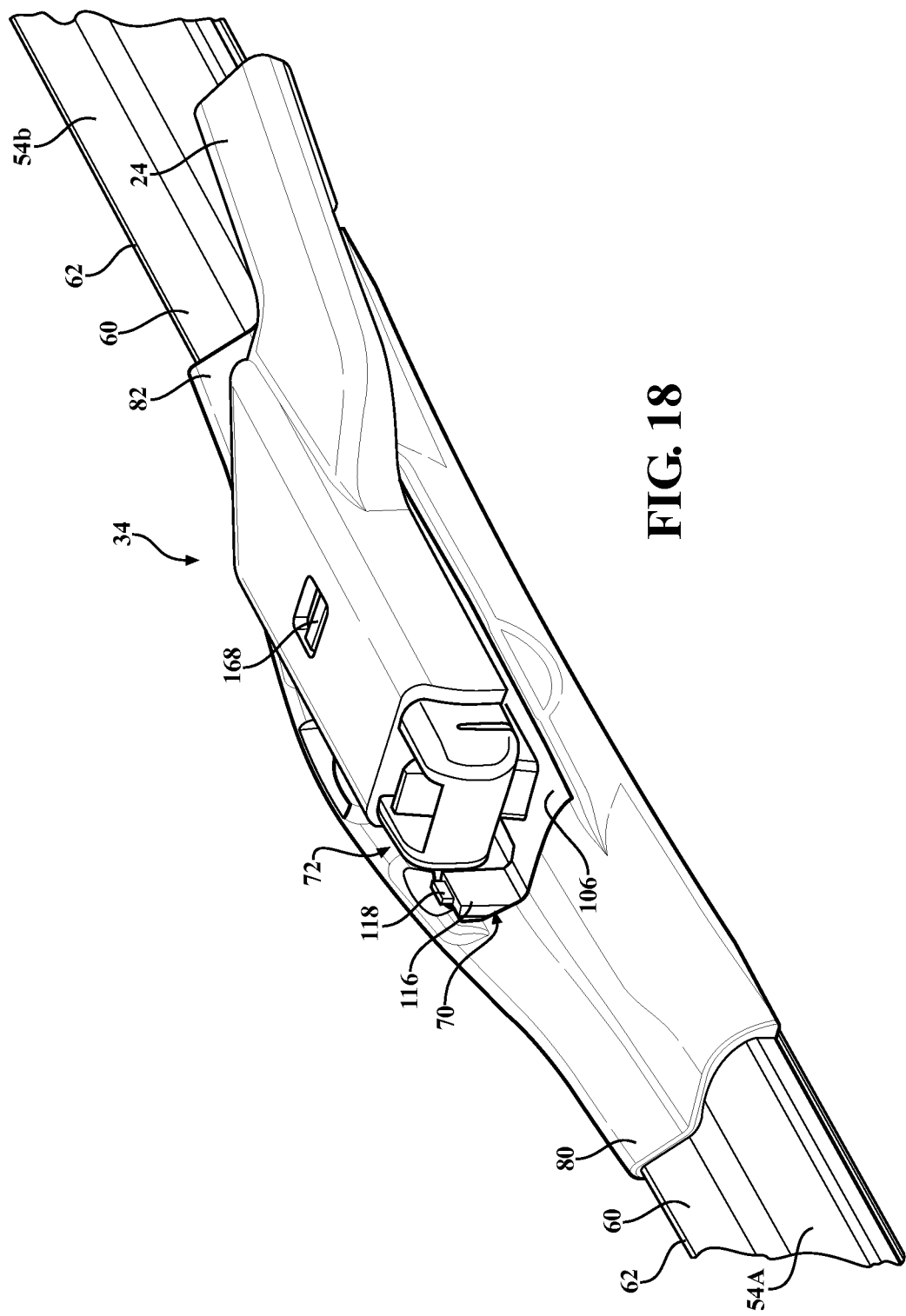
FIG. 18 is a perspective assembly view illustrating a pinch-type arm mounted to the coupler assembly.
Figure 19:
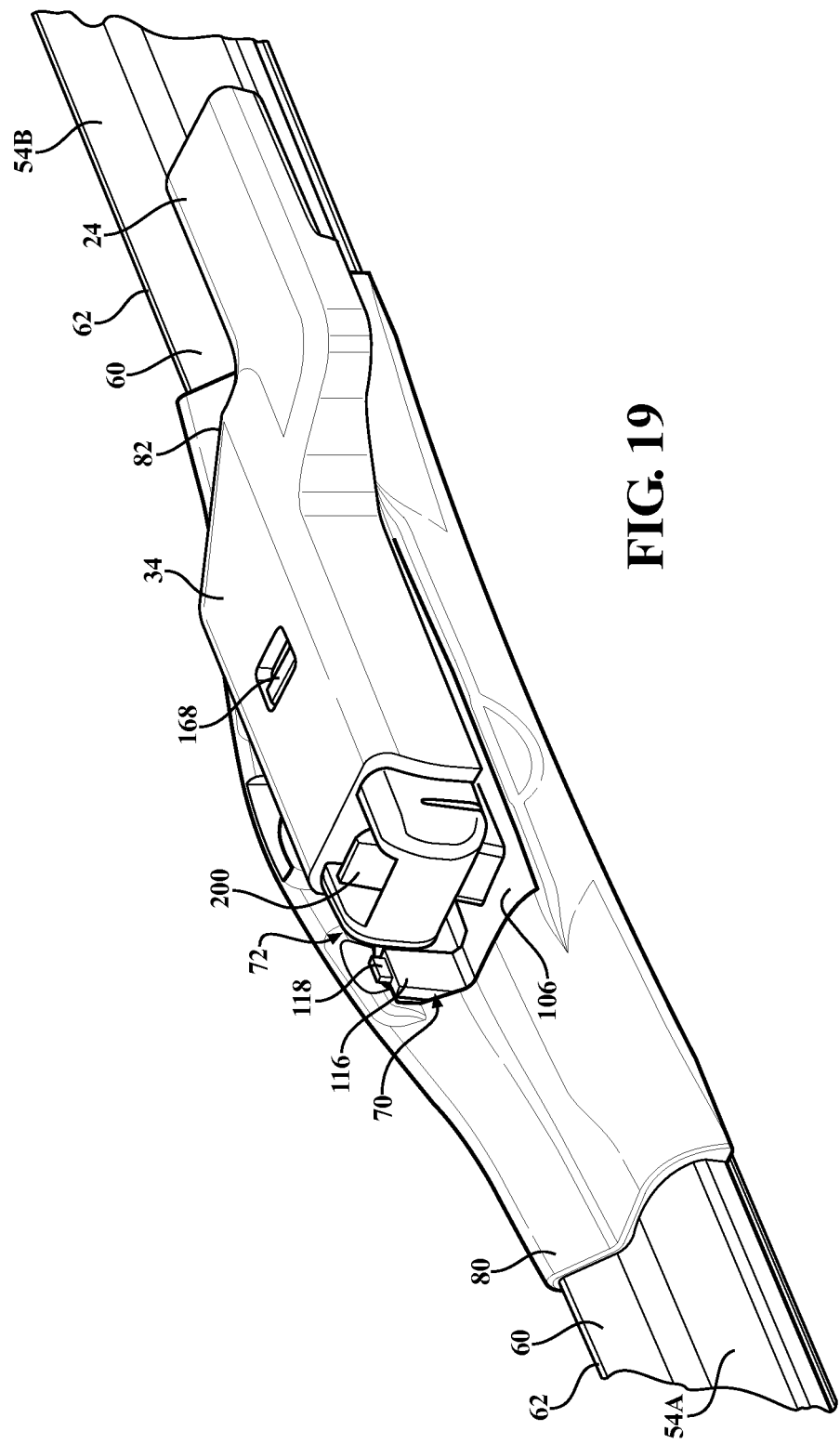
FIG. 19 is a perspective assembly view illustrating a different pinch-type arm mounted to the coupler assembly.
Figure 20:
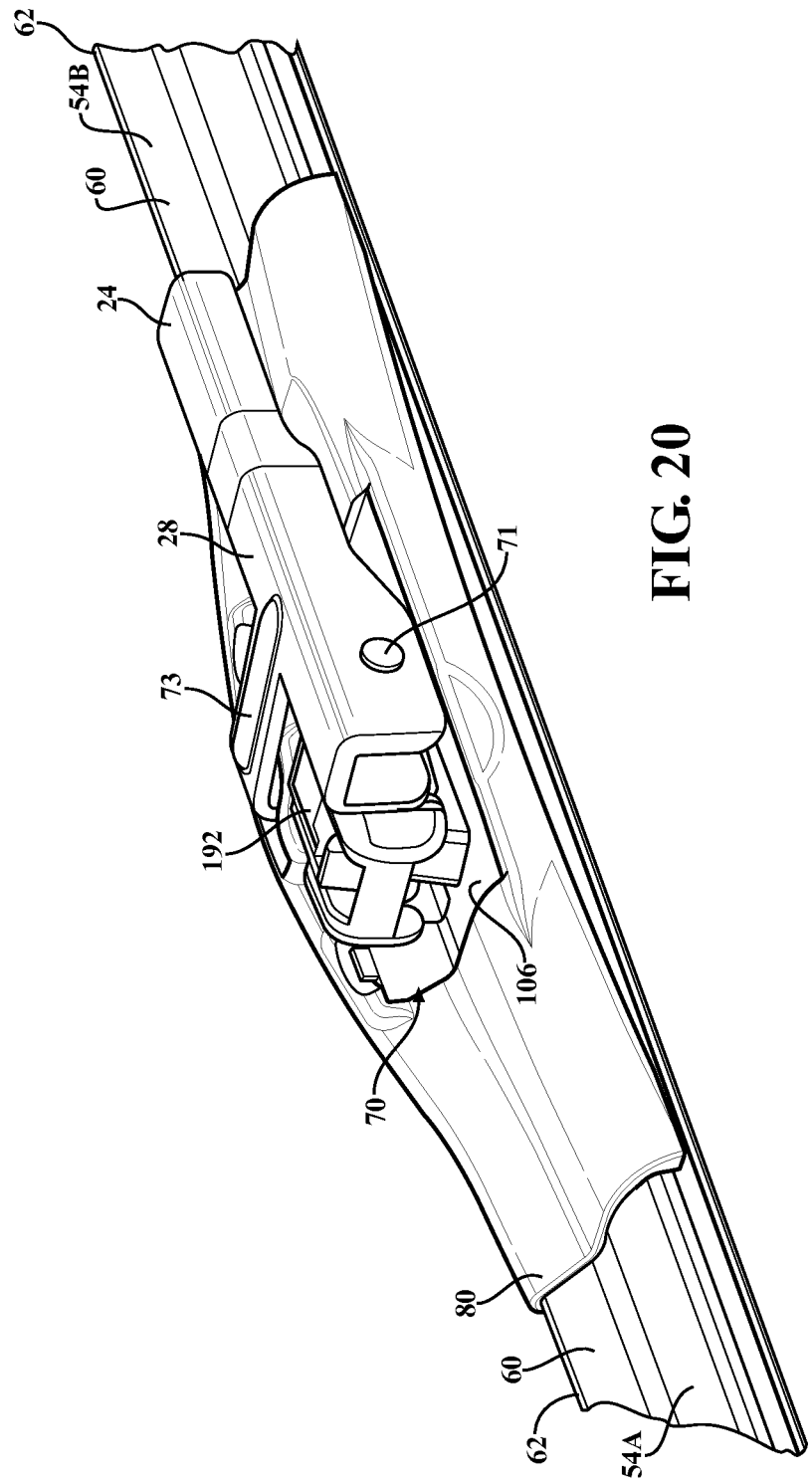
FIG. 20 is a perspective assembly view illustrating a pin-and-bent-arm type of attachment member mounted to the coupler assembly.

As shown in FIGS. 1, 18, 19 and 20, the wiper arm 24 further includes an attachment member, generally indicated at 34, that extends from the elongate body 28. FIGS. 18 and 19 show different versions of pinch-tab type attachment members 34A and 34B. FIG. 20 shows a pin-and-bent-tab type attachment member. In addition, push-button type attachment members are also commonly employed in the related art. The wiper arm attachment member 34 shown in FIG. 20 includes a pin 71 that extends transversely from the body 28 and a bent tab 73 that also extends transversely from the body 28 adjacent the pin 71. The pin 71 and bent tab 73 cooperate to attach the wiper arm 24 to a wiper assembly 26, as will be described in greater detail below.

Pinch-tab type, push-button type and pin-and-bent-tab type attachment members have been traditionally employed for connection to a beam blade windshield wiper assembly having a fixed coupler assembly that restricts use of the wiper assembly to a single type of wiper arm attachment member. However, the present invention provides a removable/interchangeable, universal coupler assembly that facilitates the use of a beam blade windshield wiper assembly in connection with several different wiper arm attachment members.

Figure 2:
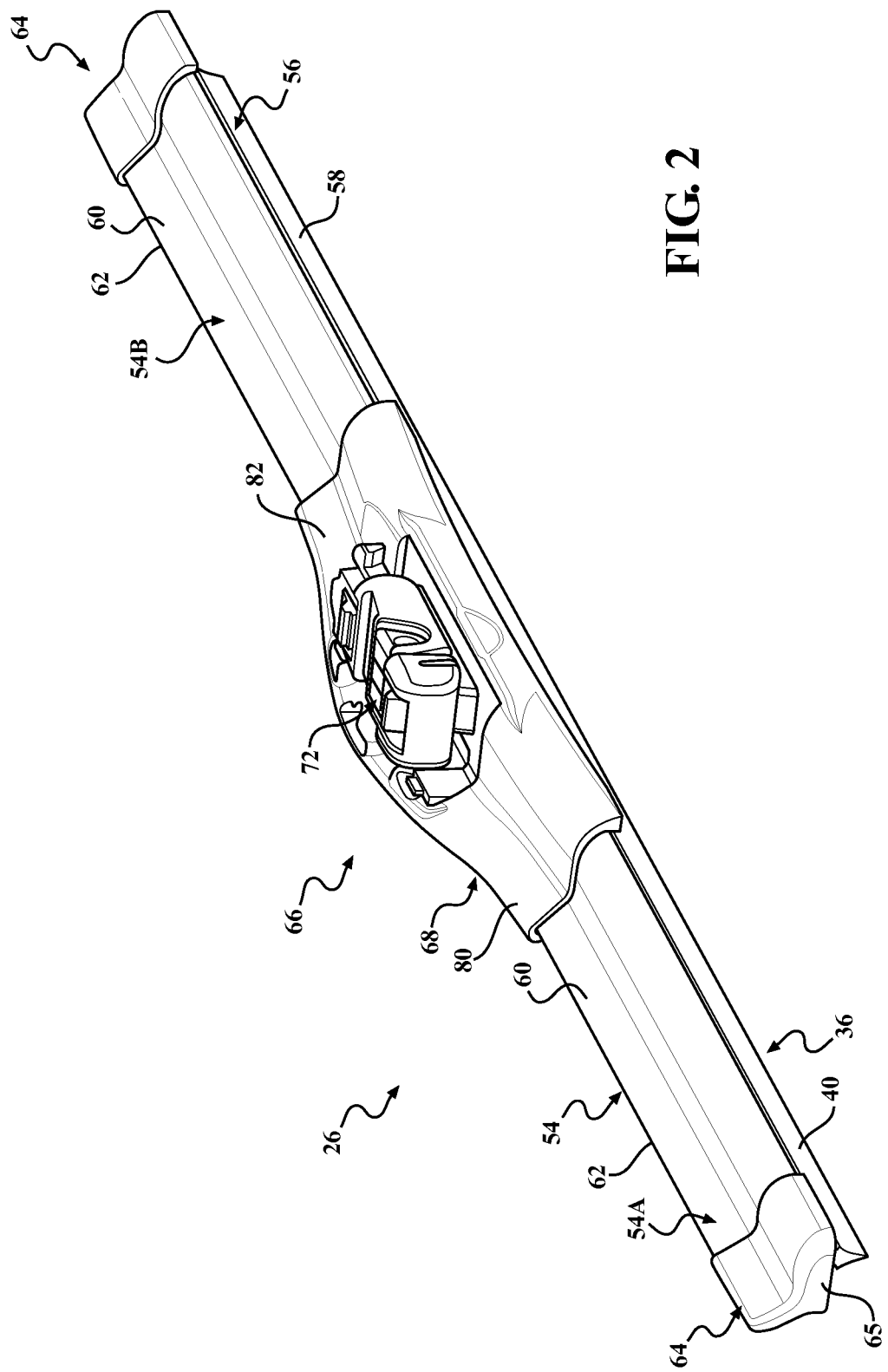
FIG. 2 is a perspective view of a windshield wiper assembly.
Figure 3:
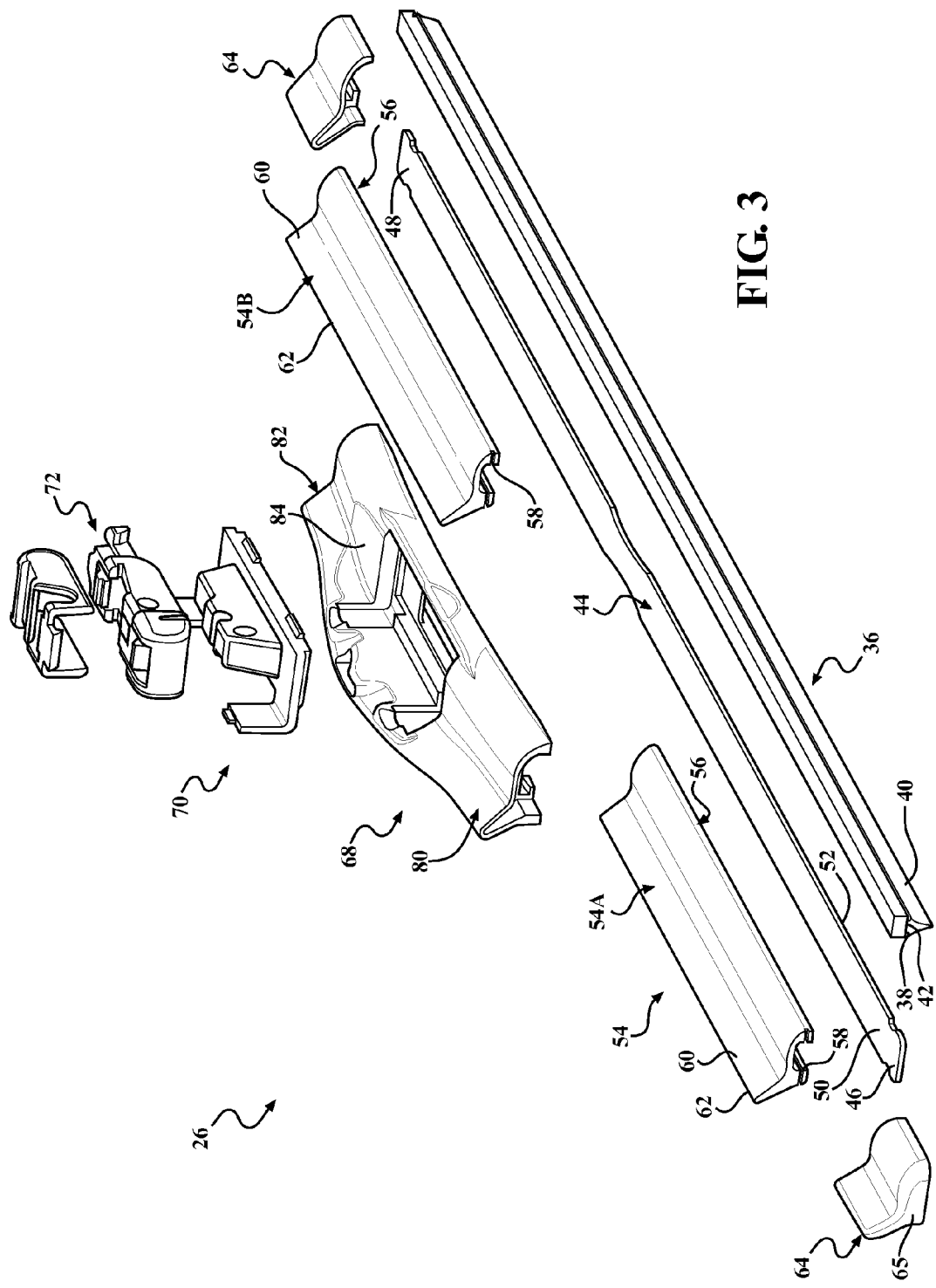
FIG. 3 is an exploded view of the windshield wiper assembly.
Figure 4:
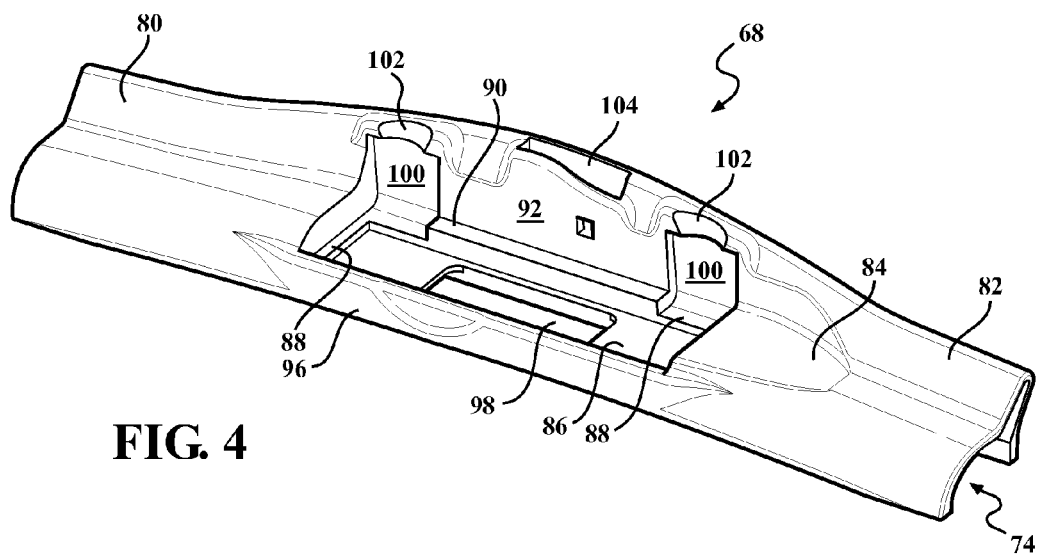
FIG. 4 is a front perspective view of the carrier of the coupler assembly.
Figure 5:
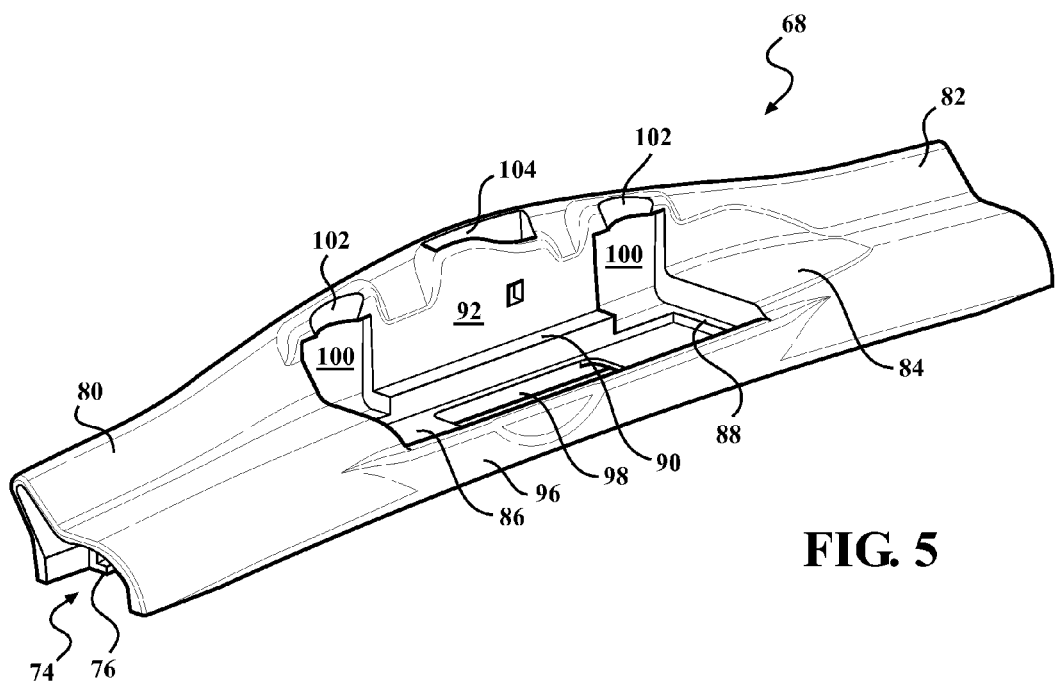
FIG. 5 is another front perspective view of the carrier of the coupler assembly.
Figure 6:
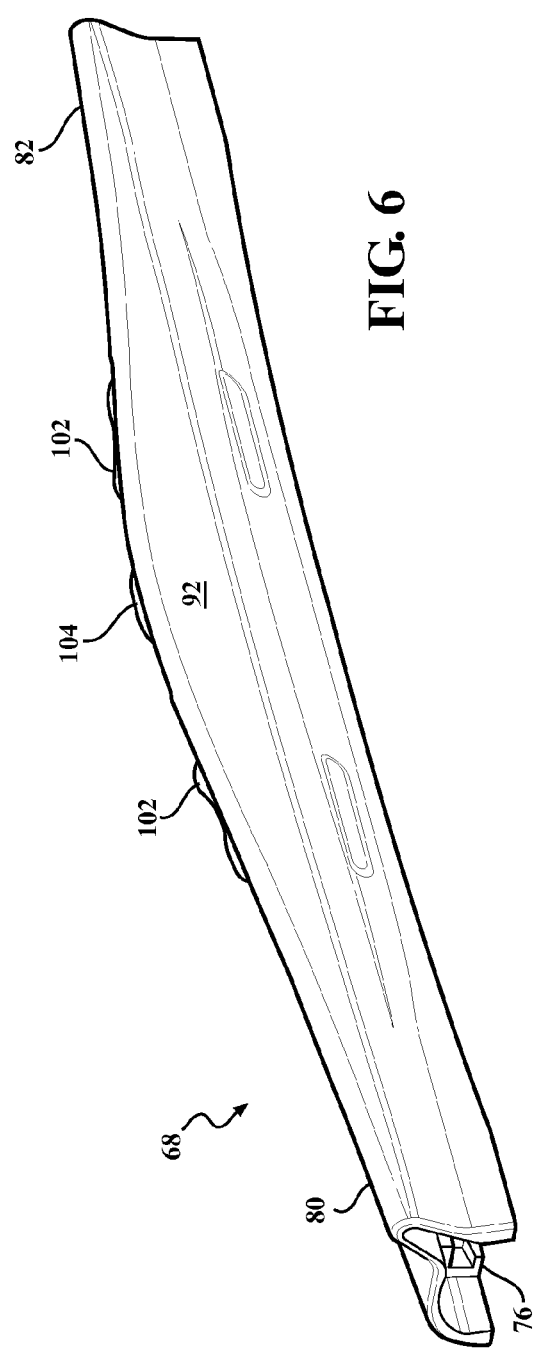
FIG. 6 is a rear perspective view of the carrier of the coupler assembly.

Referring to FIGS. 1-3, the wiper assembly 26 includes a wiping element, generally indicated at 36, that is adapted to contact the surface of the vehicle 10 to be wiped, in this representative example, the windshield 20. The wiping element 36 includes an upper section 38 and a lower section 40 that are segmented by a longitudinally extending partition 42. The partition 42 provides flexibility between the upper section 38 and lower section 40 during operational movement of the wiper assembly 24. The upper section 38 is adapted to facilitate attachment to additional components of the wiper assembly 26, as described in greater detail below, while the lower section 40 is adapted to engage the surface to be wiped.

The wiping element 36 includes a predetermined length and cross-sectional profile corresponding to a particular application and is typically manufactured through an extrusion process, which enables the length and cross-sectional profile of the wiping element 36 to be easily adjusted without a substantial increase to manufacturing expense. Furthermore, while the wiping element 36 of the present invention is constructed from a flexible rubber. Those having ordinary skill in the art will appreciate that the wiping element 36 may be constructed from any flexible material, such as silicone or other polymer, and via any manufacturing process, such as injecting molding, without departing from the scope of the invention.

The wiper assembly 26 may also include an elongated beam, generally indicated at 44, that operatively engages the wiping element 36. The elongated beam 44 is adapted to distribute downward pressure from the wiper arm 24 across the wiping element 36. As a result, the elongated beam 44 includes longitudinal ends 46 and 48 that define a predetermined length capable of facilitating distribution of the downward pressure from the wiper arm assembly 24. The elongated beam 44 further includes a top end 50 and a bottom end 52 disposed between the longitudinal ends 46 and 48. In the embodiment illustrated in the figures, the wiping element 36 is operatively engaged to the bottom end 52 of the elongated beam 44 by an adhesive/epoxy. However, those having ordinary skill in the art will appreciate that the elongated beam 44 may be operatively engaged to the wiping element 36 by other methods such as through a slot defined within the elongated beam 44 that receives a portion of the wiping element 36. Furthermore, those having ordinary skill in the art will appreciate that the wiper assembly 26 may include more than one elongated beam 44 or rails that are operatively engaged to the wiping element 36.

The elongated beam 44 may be constructed from any resiliently flexible material, such as spring steel or a polymer, that facilitates the application of force from the springloaded wiper arm 24 across the span of the elongated beam 44 toward the first and second longitudinal ends 46 and 48. To that end, the elongated beam 44 may be curved longitudinally with a predetermined radius of curvature that is the same or greater than the plane of curvature of the windshield 20. This predetermined radius of curvature is sometimes referred to in the related art as a "free form" radius of curvature (hereinafter "windshield curvature"). Accordingly, the curvature of the elongated beam 44 may be symmetrical or asymmetrical depending on the force requirements and the contour of the windshield 20. The flexible, free form, pre-curved elongated beam 44 straightens out when the wiper arm 24 applies a force thereto to flatten the elongated beam 44 and direct the wiping element 36 to contact the windshield 20. Thus, the elongated beam 44 includes a free-form curvature that ensures force distribution on windshields having various curvatures that effects proper wrapping about the windshield 20.

The elongated beam 44 includes a substantially constant thickness and may have a constant width throughout the length between the first and second longitudinal ends 46 and 48. The constant thickness is adapted to provide high lateral and torsional stiffness to avoid lateral and torsional deflection, which causes the wiping element 36 to stick/slip ("chatter") on the windshield 20 during operation. Thus, the cross-section of the elongated beam 44 is substantially uniform, which makes it easier to manufacture. More specifically, where the elongated beam 44 is constructed from metal, such as spring steel, the tools and machinery used to manufacture the elongated beam 44 are less complicated than that required to manufacture a beam 44 having a varying thickness. Furthermore, where the elongated beam 44 is constructed from a polymer, such as a thermoplastic elastomer, the tools and extrusion process machinery are also less complicated than those employed to manufacture an elongated beam having a varying thickness. However, those having ordinary skill in the art will appreciate that the elongated beam 44 illustrated herein may include a varying thickness and/or outer profile (width) without departing from the scope of the invention. By way of example, the width and/or thickness of the elongated beam 44 may taper linearly from the beam center, sinusoidally, parabolically, or asymmetrically. Additionally, the elongated beam 44 illustrated throughout the figures is a single, integral piece of material such that it defines a solid cross-section. However, those having ordinary skill in the art will appreciate that the elongated beam 44 may be formed into a single piece or multiple pieces by a plurality of laminates.

The wiper assembly 26 may also include an airfoil, generally indicated at 54, that acts to reduce the likelihood of wind lift during operational movement across the surface to be wiped. In the representative embodiment illustrated here, the airfoil 44 includes two segments 54A and 54B that include identical structure. Accordingly, the same reference numerals will be used to describe the structure of the two segments 54A and 54B of the airfoil 54. However, those having ordinary skill in the art will appreciate that the airfoil 54 may also be constructed as a single unit.

The airfoil 54 includes a base, generally indicated at 56. The base 56 includes an attachment portion 58 that engages the elongated beam 44. More specifically, the attachment portion 58 of each of the segments 54A and 54B engage a portion of the top end 50 and bottom end 52 between the longitudinal ends 46 and 48, thereby joining the airfoil 54, wiping element 36 and elongated beam 44 together. Those having ordinary skill in the art will appreciate that the airfoil 54, elongated beam 44 and wiping element 36 may be joined together through other means such as bonding the airfoil 54 to the top end 50 of the elongated beam 44 via adhesive/epoxy or by employing additional structure such as a retainer or spline that couples the wiping element 36 to the elongated beam 44 or the elongated beam 44 to the airfoil 54 without departing from the scope of the invention.

The airfoil 54 further includes a spoiler 60 that is adapted to utilize airflow to increase downward force on to the wiper assembly 26 during operational movement across the surface to be wiped. To this end, the spoiler 60 tapers inwardly from the base 56 toward a terminal point 62 to define a profile that is slightly contoured. As shown in FIGS. 2 and 3, the profile of the spoiler 60 is substantially symmetrical in cross-section. However, those having ordinary skill in the art will appreciate that the spoiler 60 may include an asymmetrical cross-sectional profile without departing from the scope of the invention. Additionally, those having ordinary skill in the art will appreciate that the airfoil 54 may include a solid-core spoiler 60 or a hollow-core spoiler 60 without departing from the scope of the invention. The airfoils 54A and 54B of the present invention are manufactured from a thermoplastic material and using a manufacturing process that may be the same as described above relative to the wiping element 36. However, it should be appreciated that the airfoils 54 may be manufactured using a different process and/or different material. By way of example, the airfoils 54 may be manufactured via an injection molding process using a polymer composition having greater hydrophobic properties than the materials used for manufacturing the wiping element 36.

The wiper assembly 26 may also include a pair of end caps, generally indicated at 64. The end caps 64 are adapted to operatively engage the airfoil 54. The end caps 64 include a profile that substantially mimics the contours of the airfoil 54 to maintain the wind lift characteristics of the wiper assembly 26 and to provide an increased aesthetic value. The end caps 64 include a closed end 65 that covers the longitudinal ends 46 and 48 of the elongated beam 44. The closed end 65 prevents infiltration of water, ice, and debris between the elongated beam 44 and the airfoil 54, which may prevent proper operation of the wiper assembly 26. The closed end 65 of the end caps 64 may be adapted to extend beyond the longitudinal ends 46 and 48 of the elongated beam 44 to facilitate contact between the outer extremities of the wiping element 26 and the surface to be wiped. More specifically, the end caps 64 provide a mass increase adjacent to the longitudinal ends 46 and 48 of the elongated beam 44 that reduce the likelihood of localized chatter along the extremities of the wiping element 26 caused by the combination of wind lift and a decrease in the force distributed to this area from wiper arm 24 via the elongated beam 44, as described above.

The wiper assembly 26 further includes a universal coupler assembly, generally indicated at 66. The universal coupler assembly 66 accommodates various sizes of "pinch-type" attachment members, "push-button-type" attachment members, as well as "pin-type" and "pin-and-bent-tab-type" attachment members that are used to connect the wiper arm and the windshield wiper assembly. To this end, the universal coupler assembly 66 includes a carrier, generally indicated at 68, a saddle, generally indicated at 70, and a coupler, generally indicated at 72. Each of these components will be described in greater detail below. More specifically, the carrier 68 is disposed along an intermediate position between the first and second airfoils 54A and 54B. Contrary to conventional beam blade-style wiper assemblies, which include a small contact point through which force from the wiper arm 24 is distributed, the carrier 68 broadens the initial point through which force is applied from the wiper arm 24 to the elongated beam 44. In this manner, the downward force from the wiper arm 24 is distributed with more efficiency across the elongated beam 44, thereby reducing the likelihood of wind lift and improving wiping action.

Figure 7:
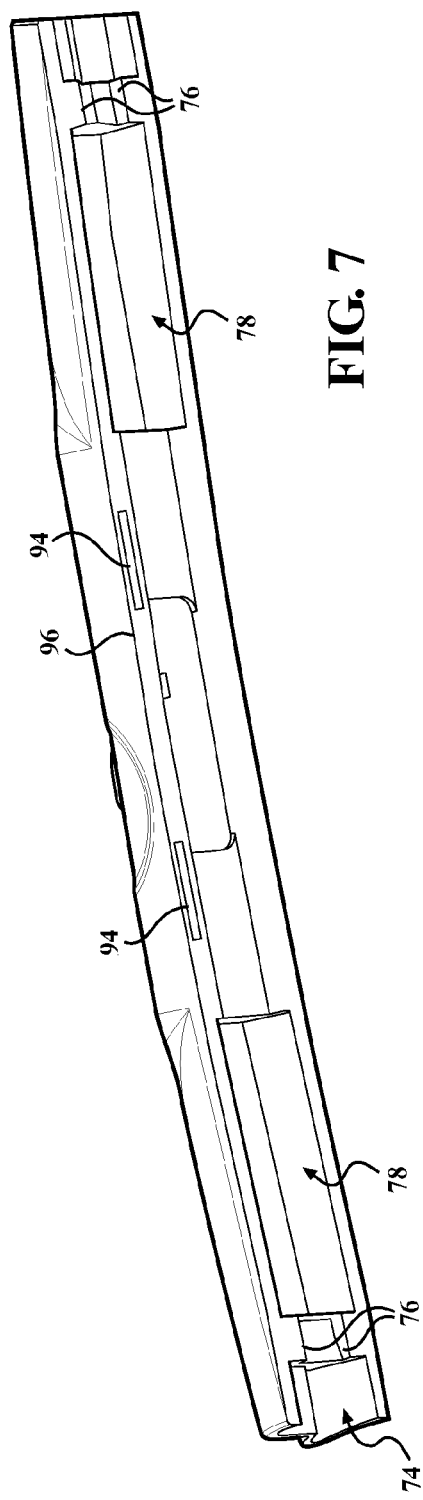
FIG. 7 is a bottom perspective view of the carrier of the coupler assembly.

Referring to FIGS. 4-7, the carrier 68 includes an interior surface 74 that is disposed in proximate relation to the elongated beam 44. The interior surface 74 includes a plurality of transversely extending tangs 76 that are adapted to operatively engage the bottom end 52 of the elongated beam 44. The tangs 76 cooperate with the remaining structure of the interior surface 74 to define a track, generally indicated at 78, that operatively receives an intermediate portion of the elongated beam 44. As shown in FIG. 7, the interior surface 74 includes four transversely extending tangs 76 operatively disposed adjacent to the airfoil segments 54A and 54B to accommodate the resiliency of the elongated beam 44. In this manner, a portion of the elongated beam 44 is retained within the track 78, but remains able to flex in response to the curvature of the surface to be wiped.

It should be appreciated that the airfoil segments 54A and 54B restrict the axial movement of the carrier 68 relative to the elongated beam 44. However, those having ordinary skill in the art will appreciate that the tangs 76 may include additional structure to prevent axial movement between the carrier 68 and the elongated beam 44. By way of example, one or more of the tangs 76 may further include a post and the elongated beam 44 may include a corresponding detent that is adapted to receive the post to prevent such axial movement of the carrier 68 relative to the elongated beam 44. Those having ordinary skill in the art will appreciate that the elongated beam 44 may be operatively attached to the carrier 68 by several methods other than as described above. By way of example, the carrier 68 may be fixed by adhesive, riveted or welded to the elongated beam 44.

The carrier 68 further includes a first end 80 that is disposed adjacent to one of the airfoil segments 54A and a second end 82 that is disposed adjacent to the other airfoil segment 54B. The first and second ends 80, 82 each include a contoured exterior surface that substantially corresponds to the contoured profile of the airfoil segments 54A and 54B. The second end 82 includes a relief surface 84 that tapers downwardly toward one of the airfoil segments 54B. The relief surface 84 is essentially a depression that will be described in greater detail below.

The carrier 68 includes a seat 86 that is essentially a depression formed in the top surface of the carrier 68. The seat 86 is bordered on at least three sides by a shelf 88. A ledge 90 extends between two portions of the shelf 88 along the back wall 92 of the carrier 68 that extends between the first and second ends 80, 82 of the carrier 68. A pair of apertures 94 (FIG. 7) are formed in the bottom of the front, lower wall 96 of the carrier 68 opposite the back wall 92. The seat 86, shelf 88, and apertures 94 are employed to located and fix the saddle 70 relative to the carrier 68 as will be described in greater detail below. The seat 86 may also include a window 98 to provide clearance for structural components of the various types of attachment members formed on the wiper arm, as the case may be.

The higher back wall 92 includes a pair of pockets 100 disposed spaced from one another. The pockets 100 are designed to cooperate with locking members formed on the saddle 70 as will be described in greater detail below. Each pocket 100 merges into a release clearance 102 formed at the upper end of the pockets 100. The release clearance 102 allow the user to removably attach/detach the saddle 70 to the carrier 68, as will be described in greater detail below. In addition, the back wall 92 may also include a contoured depression 104 disposed between the pair of pockets 100. The depression 104 is adapted to accommodate the pin-and-bent tab of the attachment member shown in FIG. 20.

Figure 8:
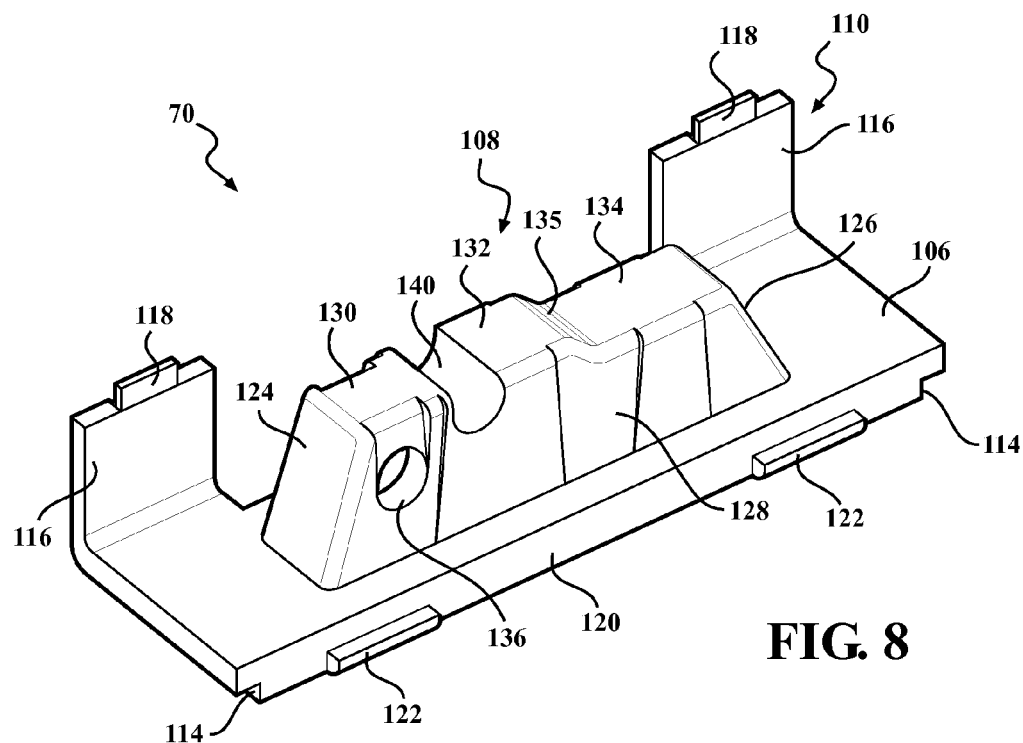
FIG. 8 is a front perspective view of the saddle of the coupler assembly.
Figure 9:
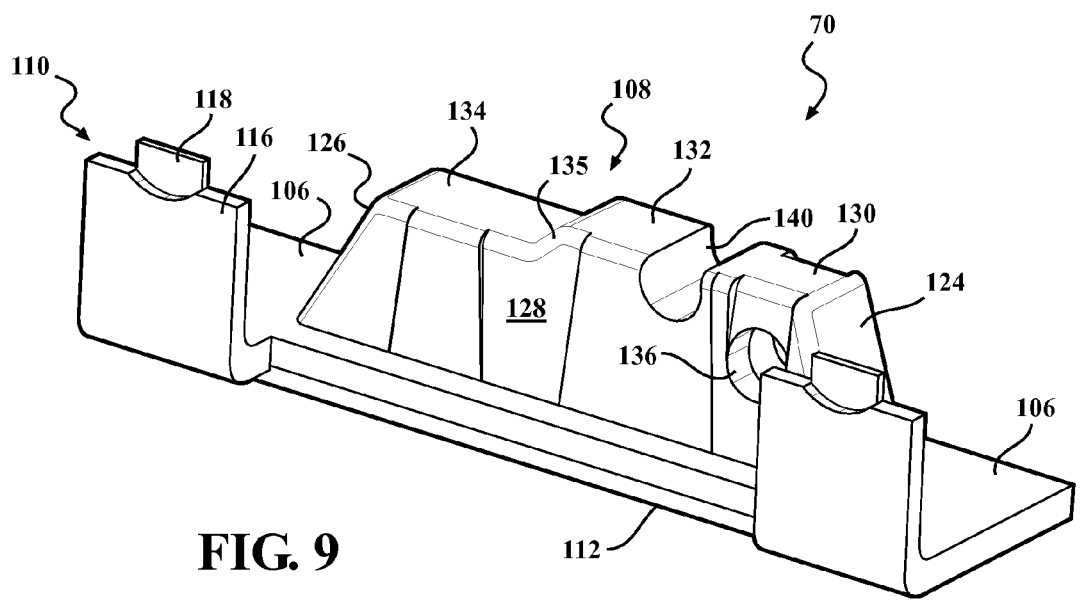
FIG. 9 is a rear perspective view of the saddle of the coupler assembly.
Figure 10:
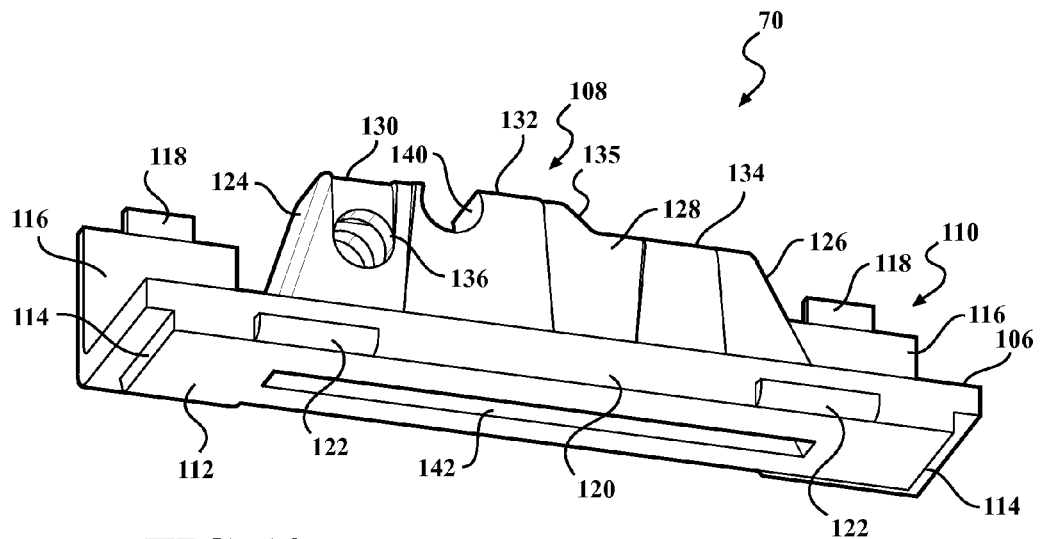
FIG. 10 is a bottom perspective view of the saddle of the coupler assembly.

The saddle 70 is best shown in FIGS. 8-10 and includes a main deck 106, a coupler mount, generally indicated at 108, and a locking mechanism, generally indicated at 110. The main deck 106 is adapted to be cooperatively received in the seat 86 formed by the carrier 68. To this end, the bottom wall 112 of the saddle 70 includes a pair of parallel spaced shoulders 114 that are adapted to cooperatively mate with the shelf 88 that borders the seat 86 on the carrier 68. The locking mechanism 110 includes a pair of locking tangs 116 that extend upwardly from the deck 106 and that correspond to the pair of pockets 100 formed on the upper back wall 92 of the carrier 68. The locking tangs 116 are complimentarily received in the pockets 100 so as to fix the saddle 70 relative to the carrier 68. Each tang 116 includes an upstanding finger 118 that may be articulated by the end user via the space provided by the release clearance 102 to disengage the saddle 70 from the carrier 68. Similarly, the forward wall 120 of the deck 106 includes a pair of locking tabs 122 that are designed to be cooperatively received in the apertures 94 formed in the lower front wall 96 of the carrier 68. In this way, the locking mechanism 110 of the saddle 70 facilitates the snap-fit attachment to the carrier 68.

The coupler mount 108 includes a tapered front wall 124, a tapered rear wall 126, and a pair of upstanding skirts 128 extending therebetween. The tapered front and rear walls 124, 126 provide rotational clearance for the coupler 72, as will be described in greater detail below. The skirts 128 may include various sections that are contoured or built up to provide interference fit between the coupler mount 108 and the coupler 72, as will be described in greater detail below. The coupler mount 108 also includes an upper fascia disposed spaced from the main deck 106. The upper fascia includes a front top surface 130, a mid-plane 132, and a rear recessed deck 134. A transition surface 135 extends between the mid-plane 132 and the rear recessed deck 134. The rear recessed deck 134 provides a clearance for the arm of the pin-and-bent-tab arm attachment member illustrated in FIG. 20. An aperture 136 may be formed through the skirt 128 below the front top surface 130 of the coupler mount 108. The aperture 136 is formed to cooperate with bosses formed on the coupler 72, as will be described in greater detail below. In addition, the coupler mount 108 may also include a side pin passage 140 formed therethrough that is designed to accommodate the cross-pin of the attachment member of the side-pin type or the pin-and-bent-tab type illustrated in FIG. 20. In addition, and as best shown in FIG. 10, the saddle 70 may include a rectangular depression 142 that is essentially a slot formed by a mold pin that is used to define the coupler mount 108.

Referring to FIGS. 2, 3, and 11-14, the coupler assembly 66 of the present invention further includes a coupler, generally indicated at 72. As noted above, the coupler 72 is adapted to facilitate removable attachment between the wiper assembly 26 and the attachment member 34. As shown in FIGS. 18 and 19, the attachment members 34 include a base and bent tab extending linearly outward from the base 21. The attachment members 34 have a pair of rails depending from the base aligned with respect to each other. The base and rails cooperate to define a track that operatively receives a portion of the coupler 72. Each of the rails includes a guide that extends linearly downward relative to the rails. Each of the guides includes a leading edge and a trailing edge, the function of each will be described in greater detail below. The trailing edge is angled relative to the base, such that the leading edge and the trailing edge form an acute angle. However, those having ordinary skill in the art will appreciate that trailing edge may also extend substantially perpendicular relative to the base without departing from the scope of the invention.

According to one embodiment, the coupler 72 includes a pair of sidewalls, generally indicated at 144. Each of the sidewalls 144 defines a surface 144A disposed generally opposed relative to the other. The opposed surfaces 144A include a recessed section 146 adapted to operatively engage the rails of the attachment member 34. A pair of flanges 148 extend outward beyond the sidewalls 144 to provide releasable engagement with the attachment member 34. More specifically, each flange 148 includes a terminal end 150 and a barb 152 disposed adjacent to the terminal end 150. The barb 152 is adapted to engage the trailing edge of the guides and thereby facilitates releasable engagement between the flanges 148 and the guides of the attachment member 34. Each terminal end 150 also includes a cam surface 154 that facilitates frictional engagement between the cam surfaces 154 and the rails on certain attachment arms 34 to bias the flanges 148 inwardly toward one another while other portions of the attachment arm are operatively connected to the coupler 72. The sidewalls 144 further include at least one raised façade 156 that provides an interference fit between the coupler 72 and the rails 25 of the attachment member 34. Those having ordinary skill in the art will appreciate that the raised façade 156 also provides additional support to the sidewalls 144 that may include more than one raised façade 156.

Figure 13:
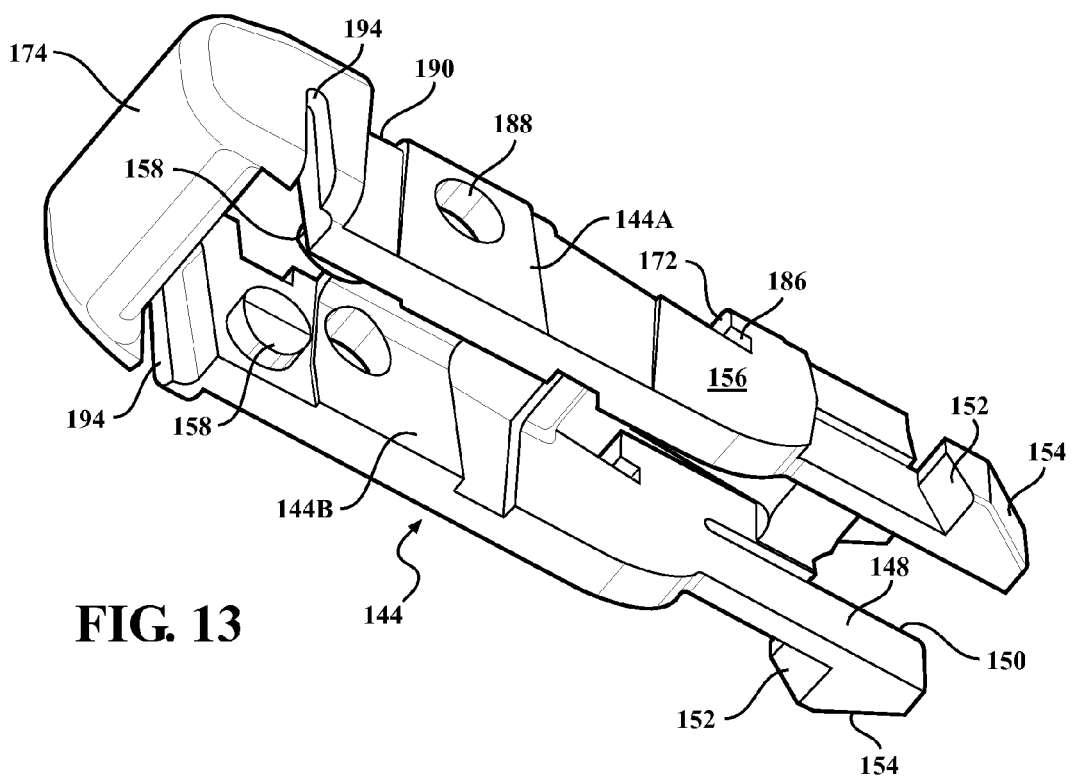
FIG. 13 is a bottom perspective view of the coupler of the coupler assembly.

Referring now to FIG. 13, each of the sidewalls 144 further includes an inward surface 144B that face each other. The inward surfaces 144B are adapted to operatively engage a portion of the coupler mount 108 of the saddle 70. The inward surfaces 144B include posts 158 that extend transversely from their respective inward surface 144B and toward each other. The posts 158 operatively engage the aligned bores 136 of the coupler mount 108 and provide a bearing surface about which the coupler 72 may pivot relative to the saddle 70. Those having ordinary skill in the art will appreciate that the inward surfaces 144B may further include additional structure for any particular purpose. By way of example the inward surfaces 144B may include one or more support ribs to provide interference fit between the sidewalls 144 and the saddle 70 as well as increase the structural integrity of the sidewalls 144.

Figure 11:
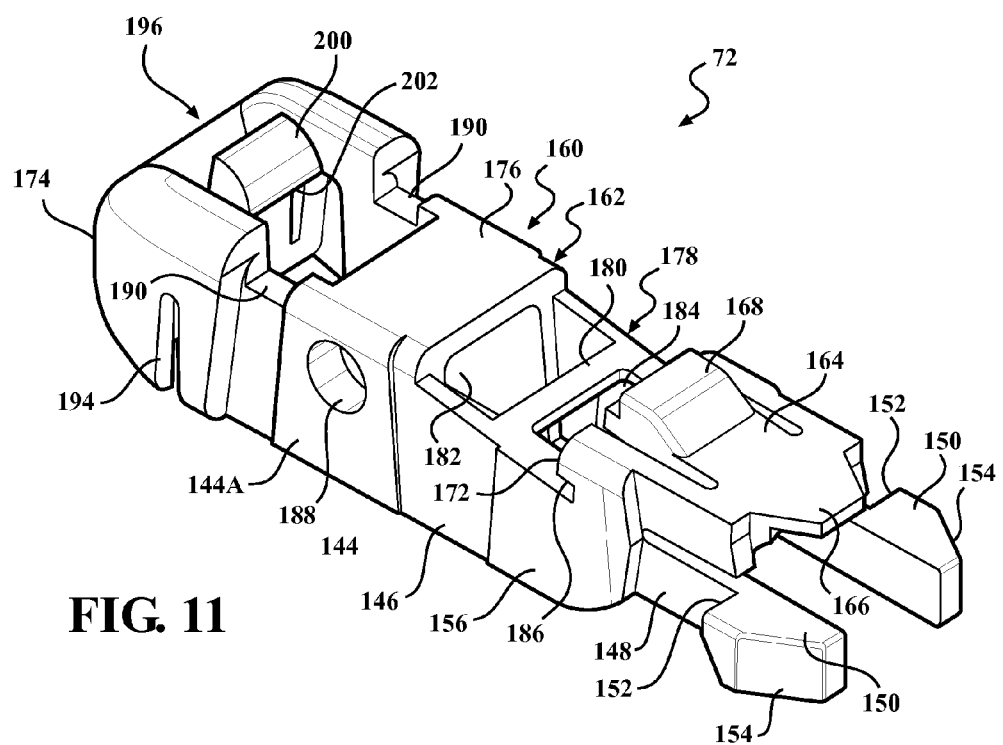
FIG. 11 is a side perspective view of the coupler of the coupler assembly.
Figure 12:
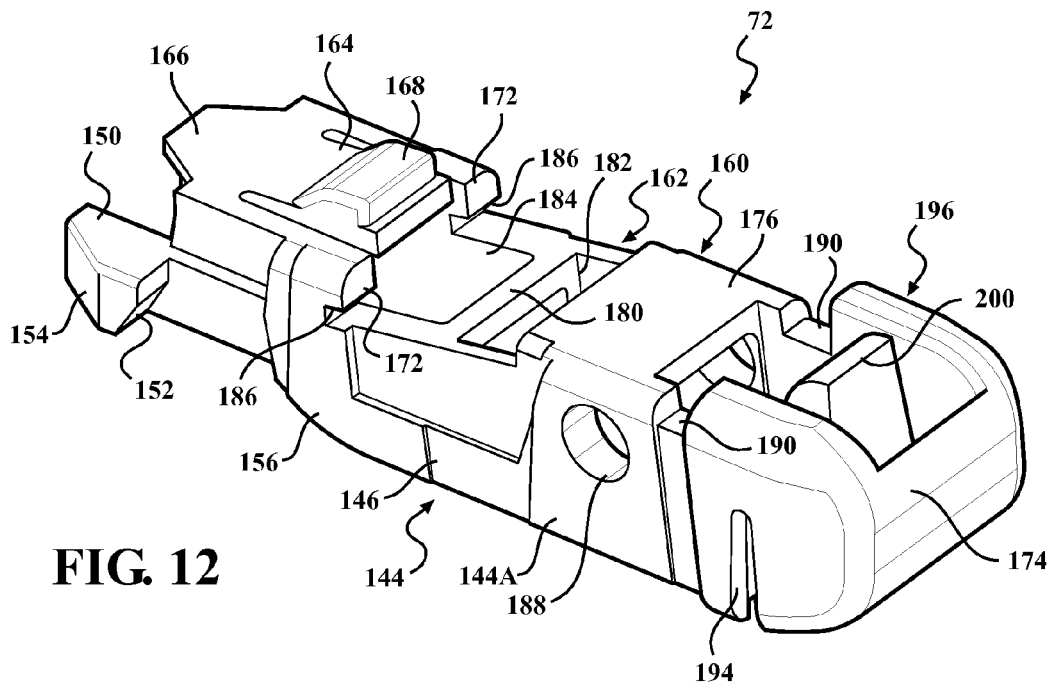
FIG. 12 is an opposite side perspective view of the coupler of the coupler assembly.
Figure 14:
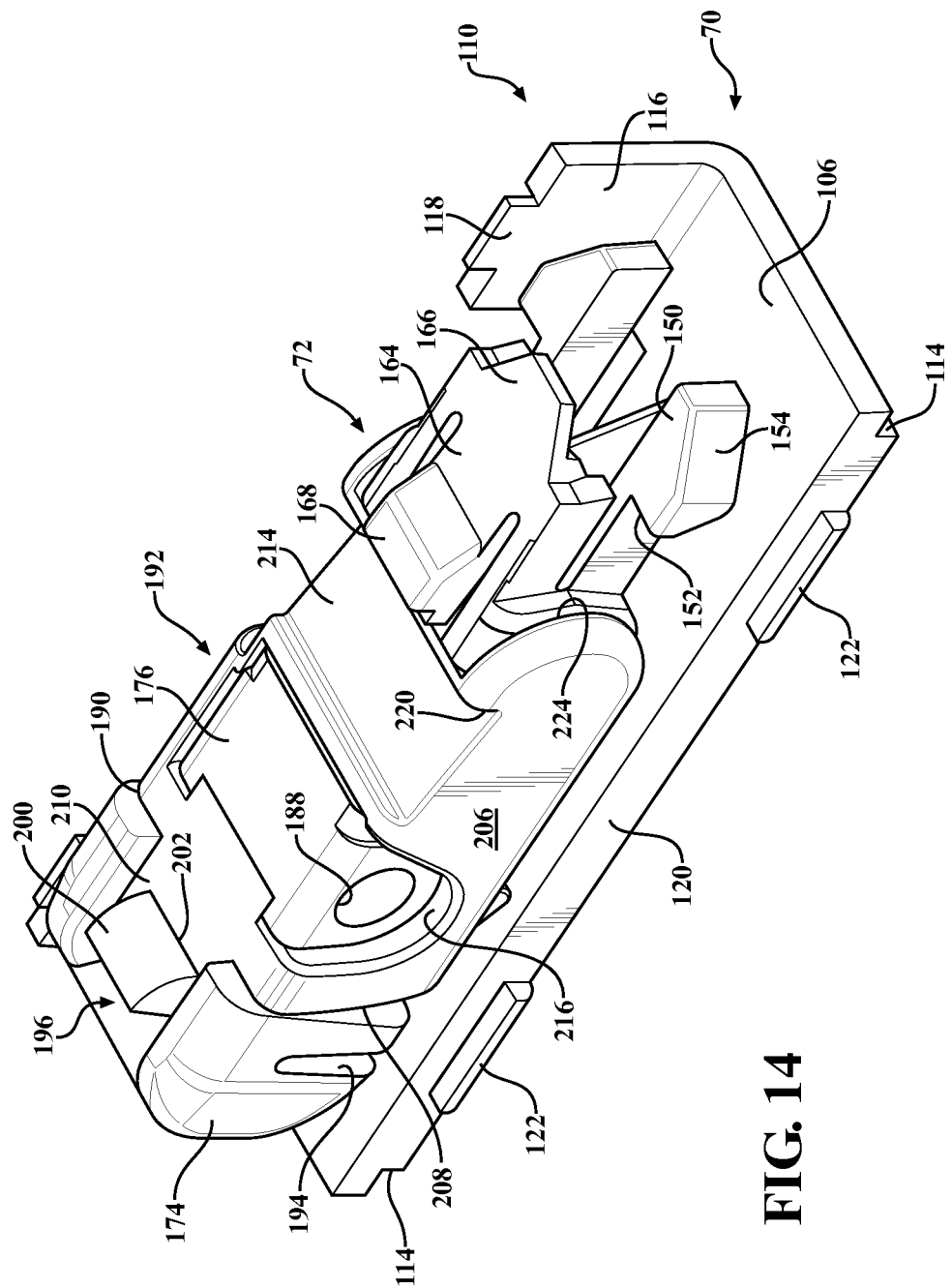
FIG. 14 is a front perspective view illustrating the coupler with a shim mounted in the saddle.

Referring now to FIGS. 11-12 and 14, the coupler 72 further includes a deck, generally indicated at 160, disposed between the sidewalls 144. The deck 160 cooperates with the sidewalls 144 to define a rest, generally indicated at 162, that is adapted to operatively receive the track 27 of the attachment member 34. The deck 160 includes a cantilevered beam 164 that is disposed between the flanges 148 so as to define a delta-shaped distal end 166 of the deck 160. The delta-shaped distal end 166 serves as a retaining tab for the pinch-type attachment member. The cantilevered beam 164 includes a raised portion 168 that is adapted to provide an interference fit against the track 27 of the attachment member 34, such that the cantilevered beam 164 is entirely disposed within the track 27 when the coupler 72 is operatively attached to the wiper arm 24.

The deck 160 further includes a raised back wall 172. The back wall 172 provides a stop to prevent undesired disconnect between the wiper arm 24 and the coupler 72. More specifically, should the barbed flanges 148 unintentionally disengage from the guides 29, the back wall 172 will stop the linear movement of the bent tab 23 relative to the coupler 72 so as to prevent the wiper arm 24 from separating from the wiper assembly 26. Those having ordinary skill in the art will appreciate that the back wall 172 provides further structural support between the sidewalls 144.

With continuing reference to FIGS. 11-12 and 14, the coupler 72 includes a nose 174 and an elevated platform 176 that are disposed between the sidewalls 144. Those having ordinary skill in the art will appreciate that the elevated platform 176 additionally provides structural support between the sidewalls 144. The deck 160 also includes a slanted mid-deck 178 that is defined by a cross-rib 180 and a pair of rectangular openings 182, 184 disposed on either side of the cross-rib 180 between the elevated platform 176 and the back wall 172. The mid-deck 178 cooperates with the back wall 172 to define a locking shoulder 186 for a purpose that will be described in greater detail below. The slanted mid-deck 178 provides clearance for the arm on the attachment member having a pin and arm/bent tab combination as illustrated in FIG. 20. A pair of aligned bores 188 extend through the sidewalls 144 beneath the elevated platform 176 and are adapted to receive the side-pin associated with the pin and pin and arm attachment members. A recess 190 is defined adjacent to the nose 174 and provides clearance for a shim, generally indicated at 192 in FIGS. 15-17, that will be described in greater detail below. In addition, the nose 174 includes a pair of arcuate slots 194 formed on the sidewalls of the nose 174. The arcuate slots 194 provide the ability of the nose 174 to flex during the installment of the coupler 72 on the saddle 70.

The coupler 72 further includes an engaging member, generally indicated at 196, that is disposed adjacent to the nose 174. More specifically, the engaging member 196 includes a cantilevered body 198 that extends from the nose 174 and has a bulbous head 200 disposed at the terminal end of the cantilevered body 198. The bulbous head 200 includes a ridge 202 depending therefrom. The ridge 202 is adapted to receive a portion of the bent tab 23 to prevent undesired release of the coupler 72 from the attachment member 34. More specifically, the ridge 202 provides an interference fit between a portion of the bent tab 23 and the engaging member 196. Additionally, those having ordinary skill in the art will appreciate that a wiper arm attachment member 34 may include additional structure, such as a lip or the like within the bent tab 23.

Figure 15:
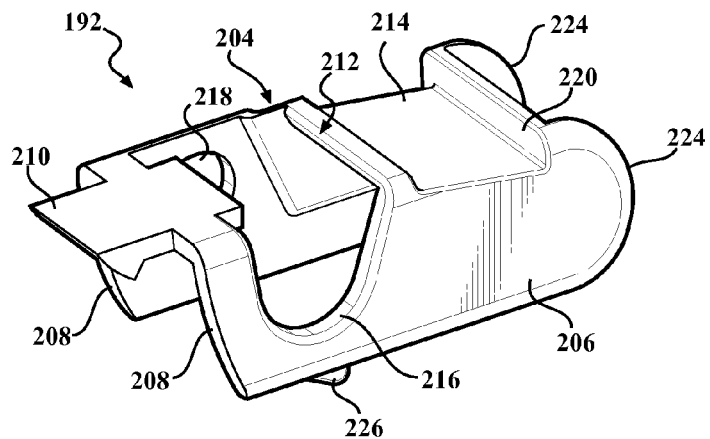
FIG. 15 is a side perspective view of the shim of the coupler assembly.
Figure 16:
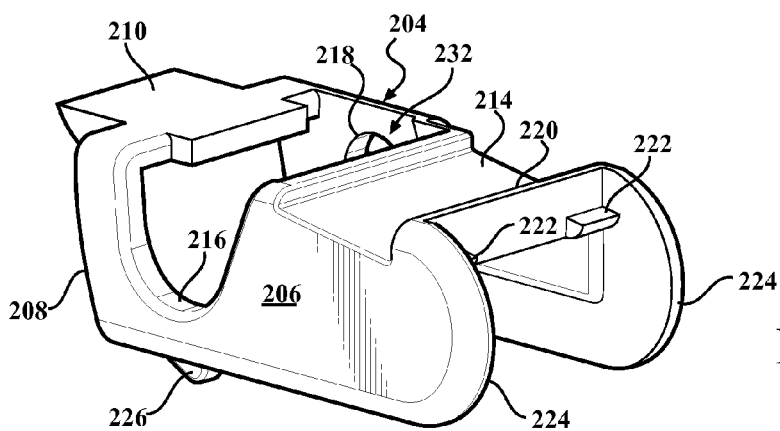
FIG. 16 is another side perspective view of the shim of the coupler assembly.
Figure 17:
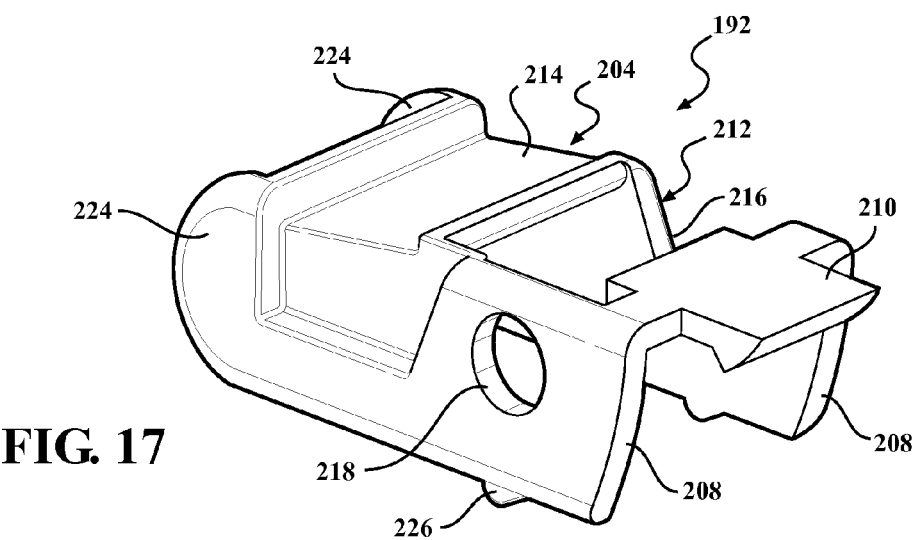
FIG. 17 is an opposite side perspective view of the shim of the coupler assembly.

As noted above, the coupler may also include a shim that is generally indicated at 192 in FIGS. 15-17. The shim 192 is employed to accommodate all side pin and pin and arm attachment members, as well as the wide push-button attachment members of the type illustrated in FIGS. 18-20. The shim 192 includes a U-shaped body 204 that is adapted to be mounted to the deck 160 of the coupler 72 as illustrated in FIG. 14. To this end, the shim 192 includes a pair of sidewalls 206 that terminate in a pair of fenders 208 that are adapted for abutting engagement with the recess 190 formed adjacent to the nose 174 of the coupler 72. A forward locking finger 210 extends in cantilevered fashion between the pair of fenders 208 and is adapted for locking engagement with the bulbous head 200 of the engagement member 196. The shim 192 also includes an opening 212 defined between the forward locking finger 210 and a slanted back deck 214. One sidewall includes an arcuate side pin boss clearance 216 while the opposite sidewall of the shim body 204 includes a pin hole 218. The pin hole 218, opening 212, and side pin boss clearance 216 cooperate to accommodate the side-pin type attachment members. Similarly, the slanted back deck 214 provides clearance for the transverse arm of the pin-and-bent-tab attachment member 34 illustrated in FIG. 20. The slanted back deck 214 terminates in an end wall 220 that is adapted to be in abutting contact with the back wall 172 of the coupler 72. A pair of flanges 222 extend from the end wall rearwardly and cooperate with the locking shoulder 186 on the coupler 72 to mount the shim 192 thereto. The body 204 further defines a pair of arcuate terminal arms 224 that cooperate with the sidewalls 144 of the coupler 72 in side-by-side fashion to stabilize the shim 192 relative to the coupler 72. Each sidewall 206 also includes a downwardly extending stop 226 that cooperates with corresponding structure on the sidewall of the wide pushbutton attachment member to limit the movement of the attachment member relative to the coupler.

The embodiment of the wiper assembly of the present invention illustrated in FIGS. 2-13 is properly assembled when the coupler assembly 72 is seated on the saddle 70, which in turn is mounted to the carrier 68 and the aligned posts 158 operatively engage the bores 136. This embodiment of the coupler assembly 66 of the wiper assembly 26 is properly attached to either of the wiper arm attachment members 34 by inserting the bent tab under the ridge 168, and rotating the wiper assembly 26 such that the barbs 152 of the flanges 148 flex between the guides and then expand outward to be seated adjacent the trailing edges. Regardless of the style of attachment members, proper attachment of the wiper assembly 26 is further achieved when the track of any attachment member is seated on the coupler mount 108. On the other hand, replacement of the wiper assembly 26 of the present invention illustrated in FIGS. 2-13 is accomplished by applying force to the barbs 152 in an inward direction toward each other, thereby disengaging the barbs 152 from contact with the trailing edges and rotating the wiper assembly 26 away from the wiper arm 24 such that the bent tab 23 disengages from contact with the ridge 168. In addition and as noted above, the coupler assembly 66 may be employed with various sizes of side-pin type as well as pin-and-bent-tab type attachment members.

The present invention provides a universal coupler for a beam blade windshield wiper assembly that is adapted to releasably engage several different wiper arm attachment members, thereby reducing the need for several different windshield wiper assemblies at the OEM level. In addition, the present invention provides an interchangeable coupler assembly that can engage several different wiper arm attachment members, thereby reducing the need for multiple aftermarket beam blade windshield wiper replacement assemblies having the same superstructure but a different, single-application, coupler assembly to reduce the costs associated with point-of-sale packaging and replacing a beam blade wiper blade assembly.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A beam blade windshield wiper assembly having a universal coupler assembly, said windshield wiper assembly comprising:
    a wiping element that contacts the surface to be wiped, at least one elongated beam having a pair of longitudinal ends, and a coupler assembly;
    said coupler assembly including a carrier that is mounted to said at least one elongated beam between said longitudinal ends, said carrier including a top surface and a seat formed on said top surface of said carrier;
    a saddle that is removably received and retained in said seat of said carrier, said saddle including a main deck, a coupler mount, and a locking mechanism for releasably engaging said carrier, said main deck adapted to be cooperatively received in said seat formed by said carrier; and
    a coupler that is adapted to be mounted to said saddle, said coupler including a pair of sidewalls, and a deck disposed between said sidewalls, said deck serving to cooperate with said sidewalls to define a rest that is adapted to operatively receive the track of an attachment member, said coupler further including a pair of flanges extending outwardly beyond each of said sidewalls to provide releasable engagement with an attachment member; said carrier further including first and second longitudinal ends, a front wall, a raised back wall disposed opposite said front wall that extends between said first and second longitudinal ends of said carrier, and a top surface, said carrier further including a shelf that borders said seat on at least three sides thereof, a ledge extends between two portions of said shelf along said back wall, and a pair of apertures are formed on said front wall of said carrier opposite said back wall, said seat, shelf, ledge and apertures cooperating to locate and fix said saddle relative to said carrier; and
    said back wall of said carrier includes a pair of pockets disposed spaced from one another, said saddle including a locking mechanism that cooperates with said pair of pockets formed on said back wall of said carrier to releasably mount said saddle to said carrier, said locking mechanism further including a pair of locking tangs that extend upwardly from said main deck and that correspond to said pair of pockets formed on said back wall of said carrier, said locking tangs being complimentarily received in said pockets so as to fix said saddle relative to said carrier.

2. A beam blade windshield wiper assembly as set forth in claim 1 wherein said coupler mount has a pair of aligned apertures, each of said sidewalls of said coupler includes an inward surface that face one another, said inward surfaces adapted to operatively engage a portion of said coupler mount of said saddle, said inward surfaces further including posts that extend transversely from their respective inward surface and toward one another, said posts operatively adapted to engage said aligned apertures of said coupler mount and provide a bearing surface about which said coupler may pivot relative to said saddle.

3. A windshield wiper assembly as set forth in claim 1 wherein each said locking tang includes an upstanding finger that may be articulated so as to provide a release clearance to disengage said saddle from said carrier.

4. A windshield wiper assembly as set forth in claim 1 wherein said main deck of said saddle further includes a pair of locking tabs that are adapted to be cooperatively received in said apertures formed in said front wall of said carrier, such that said locking mechanism of said saddle facilitates a snap fit attachment to said carrier.

5. A windshield wiper assembly as set forth in claim 1 wherein said saddle includes a bottom wall having a pair of spaced shoulders that are adapted to cooperatively mate with said shelf that borders said seat on said carrier.

* * * * *